United States Patent [19]
Rodgers et al.

[11] 3,750,234
[45] Aug. 7, 1973

[54] CRAB PICKING MACHINE

[75] Inventors: Nellie Hunt Rodgers; William P. Hunt; Richard T. Wenstrom, all of Hampton, Va.

[73] Assignee: Sea Savory, Inc., Cambridge, Md.

[22] Filed: Apr. 22, 1971

[21] Appl. No.: 136,427

[52] U.S. Cl. .................................... 17/71, 17/48
[51] Int. Cl. ............................................ A22c 29/00
[58] Field of Search ........................... 17/48, 71, 74

[56] References Cited
UNITED STATES PATENTS

| | | | |
|---|---|---|---|
| 2,832,989 | 5/1958 | Harris | 17/48 |
| 3,528,124 | 9/1970 | Wenstrom et al. | 17/48 |
| 2,818,598 | 1/1958 | Skrmetta | 17/74 |
| 3,375,547 | 4/1968 | Reinke | 17/71 |

*Primary Examiner*—Lucie H. Laudenslager
*Attorney*—Sughrue, Rothwell, Mion, Zinn & Macpeak

[57] ABSTRACT

An endless, cleated conveyor belt inclined upwardly elevates cooked crabs for free fall at the discharge end of the belt onto the rear of a perforated shaker screen. The direct fall impact breaks up the crabs allowing small meat particles and waste to fall through the shaker screen onto a second endless conveyor belt for sorting. The larger crab particles are recirculated to the elevator conveyor belt for multiple cycle, free fall impact onto the perforated shaker screen.

21 Claims, 7 Drawing Figures

PATENTED AUG 7 1973 3,750,234
SHEET 1 OF 2
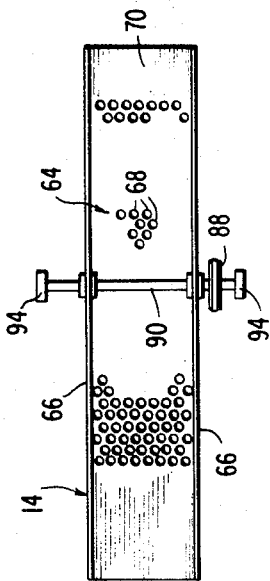
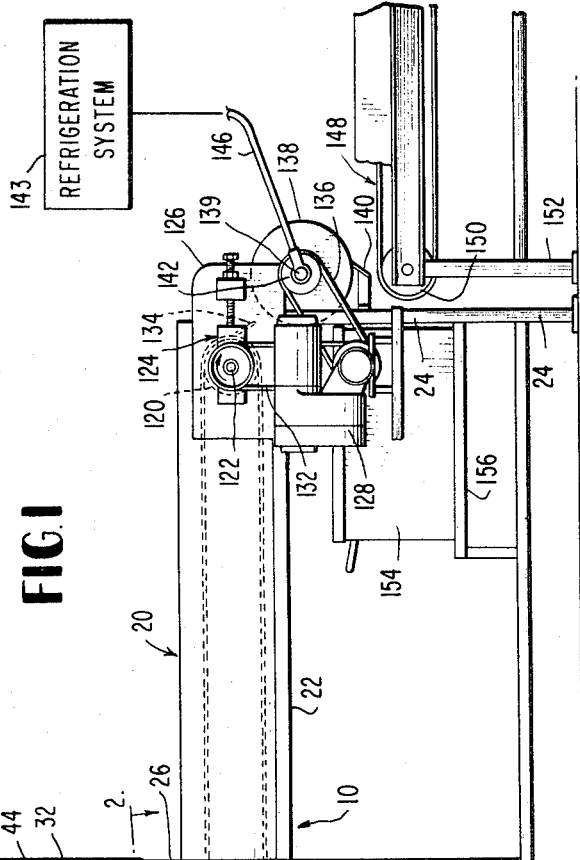
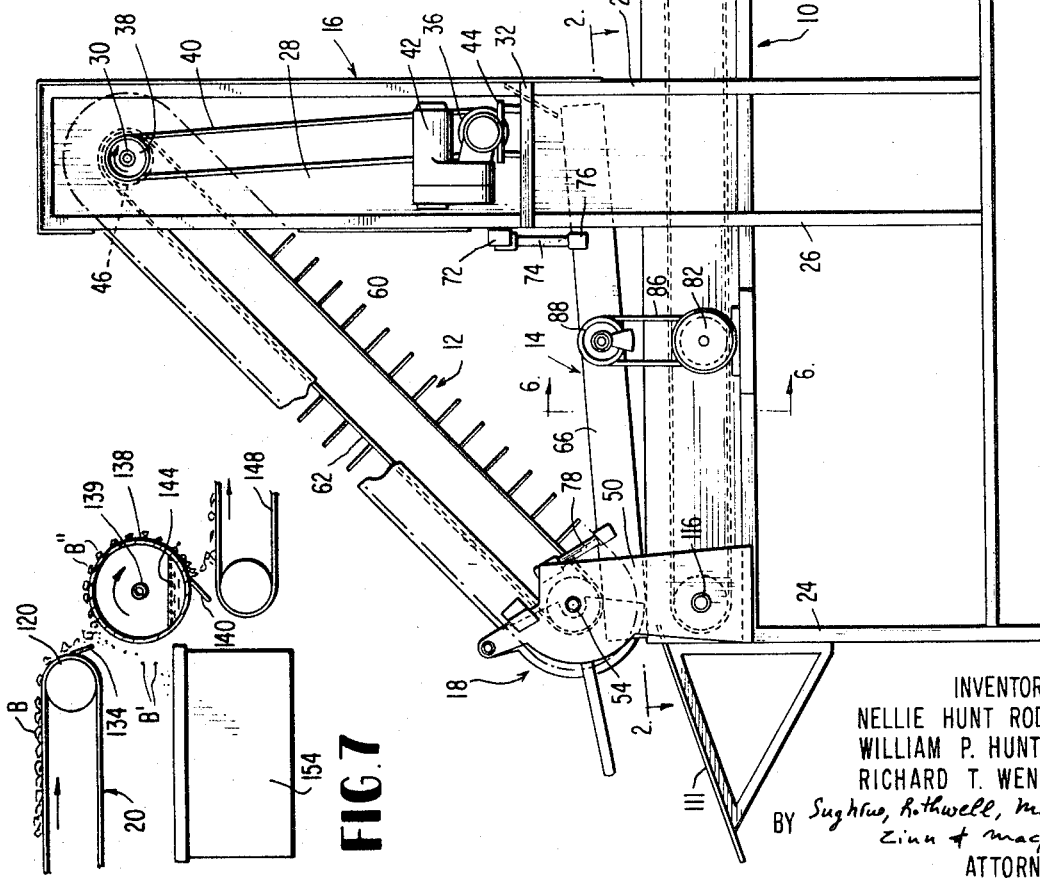
INVENTORS
NELLIE HUNT RODGERS
WILLIAM P. HUNT
RICHARD T. WENSTROM
BY Sughrue, Rothwell, Mion, Zinn & Macpeak
ATTORNEYS

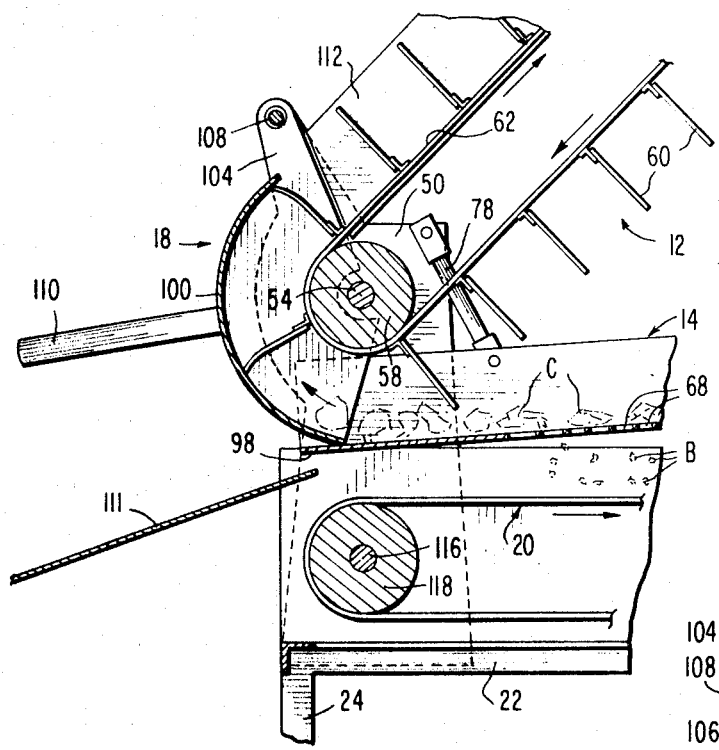
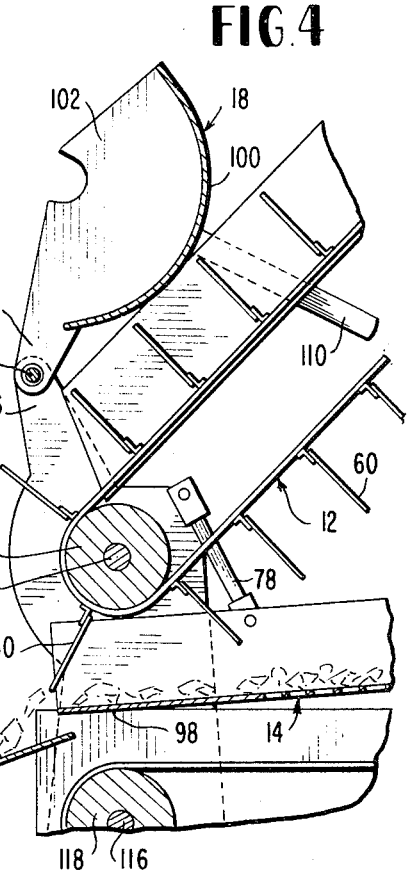
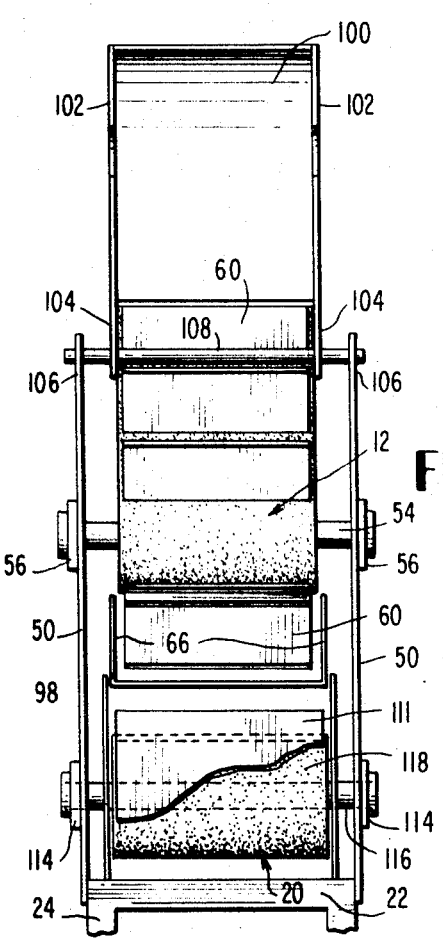
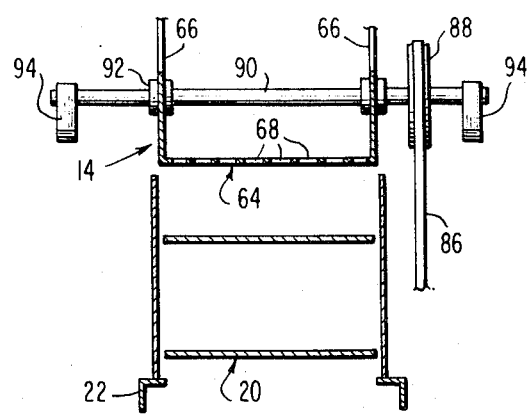
FIG. 3
FIG. 4
FIG. 5
FIG. 6

CRAB PICKING MACHINE

BACKGROUND OF THE INVENTION

1. Field of the Invention

This invention relates to an apparatus for facilitating the removal of meat from cooked crabs or other crustaceans and, in particular, to a machine which assists in the separation of the edible meat from the shells.

2. Description of the Prior Art

For many years, the common blue crab of the Chesapeake Bay and similar tidal areas has been manually processed after cooking by breaking open the shelled crab or like crustacean and hand picking of the edible meat from the other unedible portions and the shells. When labor was relatively cheap and available, the processing of the crabs was achieved manually to an extent sufficient to meet the demand. Due to the increased cost of labor, the lack of trained pickers and the relatively low rate of processing of the crabs, there have been attempts to provide automatic or partially automatic processing equipment to facilitate the removal of the edible crab meat from the whole crab after cooking. Certain attempts have involved the utilization of machinery which, in sequence, holds the crab, removes the outer shell, further removes the entrails and the like and finally removes the edible meat from the remainder. Not only are such apparatus complicated and therefore costly, but unflexible in terms of properly holding the variable sized crabs being processed, and, in most cases, remove only a portion of the edible meat.

SUMMARY OF THE INVENTION

The present invention is directed to an improved crab picking machine which makes use of multiple cyclic processing of the same crab by recirculating the crab through the machine. It employs the free fall of the crabs from a given height onto a hard surface to break up the crab into parts to facilitate removing of the edible crab meat from the other parts after free fall impact and disintegration.

Specifically, the apparatus of the present invention involves an elevator for raising and cooked crabs to a given height above a perforated shaker screen and allowing the free fall of the crab onto the perforated screen. By impact, the crab is broken up into several parts and continued movement of the parts of the crab longitudinally of the vibrator-shaker screen causes particles of meat and waste of given size to pass through the screen openings onto an underlying meat catching member. Preferably, the meat catching member comprises, in turn, an endless conveyor belt which moves the edible meat and other unedible portions of the crab passing through the perforations, past a manned culling area where the unedible parts of the crab are removed from the edible meat particles. Preferably, the elevator consists of an endless belt recycling conveyor having cleats extending perpendicular to the plane of the conveyor belt. The endless conveyor belt is inclined upwardly and its movement is reverse to the direction of movement of the crabs on the perforated shaker screen. The perforated shaker screen, in turn, is inclined slightly so that during vibration caused by oscillation of the same the broken crab particles move toward the discharge end of the shaker screen. Preferably, discharge end of the shaker screen underlies the cleated conveyor belt and a hinged recycling hood, having a curvature corresponding to that of the endless conveyor belt as it moves about the periphery of a support pulley, co-operates with the cleats on the conveyor belt to cause those crab particles of a size greater than the screen openings or perforations to move up and onto the top run of the cleated conveyor belt, for recirculation and recyclic free fall onto the impact end of the perforated shaker screen.

The shaker screen is preferably flexibly supported at both ends to an overlying support being suspended by neoprene straps. A free fall chute comprising a three sided enclosure defines a vertical path extending from the discharge end of the endless cleated conveyor belt to the upstream edge of the perforated shaker screen. The shaker screen constitutes a sheet metal plate having perforations downstream of an impact area which directly underlies the discharge end of the cleated conveyor belt. The sheet metal shaker screen is further provided with vertically upstanding walls on each side to prevent the crab particles from falling out of the same during their longitudinal movement under a vibratory mode. Vibration is achieved by an eccentric rotatably coupled to drive pulley rotatably mounted on one of the side walls of the shaker screen and driven by a motor fixed to the base of the apparatus. The discharge end of the shaker screen extends beyond the intake end of the cleated conveyor belt. The pivotable recycling hood pivots about a horizontal axis parallel with that of the conveyor belt pulley and above the same such that the arcuate hood in pivoting away from the discharge end of the shaker screen allows the selective discharge of the remnant particles of the crabs unable to pass through the perforated shaker screen into a trash or garbage receptacle.

BRIEF DESCRIPTION OF THE DRAWINGS

FIG. 1 is a side elevational view of the improved crab picking machine of the present invention.

FIG. 2 is a plan view of the shaker screen of the machine of FIG. 1.

FIG. 3 is an enlarged side elevational view of one end of the machine of FIG. 1, with the recycling hood in recycle position.

FIG. 4 is a similar view to that of FIG. 3 with the recycling hood in raised position allowing free discharge of waste from the shaker screen.

FIG. 5 is an end view of the portion of the machine illustrated in FIG. 4 as viewed from the direction of arrow A.

FIG. 6 is a sectional elevation of the machine of FIG. 1, taken about lines 6—6.

FIG. 7 is a fragmentary side elevational view, in section of the meat separating portion of the machine.

DESCRIPTION OF THE PREFERRED EMBODIMENT

Referring to the drawings, the improved crab picking machine of the present invention comprises an apparatus consisting of a number of principal components. A fixed support table 10 has mounted thereon, an endless cleated recycling feed conveyor 12 and an underlying shaker screen assembly 14, a fixed free fall chute 16, a pivotable recycling hood 18 mounted at the feed or intake end of the endless recycling conveyor belt 12 and the discharge end of the shaker screen assembly 14, and an endless meat discharge and culling conveyor belt 20 which underlies the shaker screen assembly 14.

The apparatus employs as a fixed support, table 10, which consists of a table top 22 supported by a plurality of vertical legs or supports 24. Intermediate of the ends of the machine, FIG. 1, the table employs extended vertical frame members 26 to support on both sides, and toward the right hand end, panel members 28 which define the sidewalls and one end wall of chute 16. Further, chute 16 carries at its upper end, a transversely extending rotatable shaft 30 on suitable bearings (not shown), the shaft being adjustable along an inclined path to vary the tension within endless conveyor belt 12. Shaft 30 carries a pulley 38 on the outside of panel 28, the pulley being coupled by drive belt 40 and drive pulley 36 to conveyor drive motor 42 fixedly mounted on a support plate 44, the plate 44 being in turn fixed to the frame members 26 by similar frame members 32.

Intermediate of the side panels 28, the shaft 30 supports a large conveyor drive pulley 46, the pulley being of a width sufficient to carry the endless cleated recycling conveyor belt 12 which extends downwardly and forwardly between panels 28. At the forward end of the machine, there is provided a pair of upstanding side plates 50 which are fixed to the frame member 29 and table top 22 by a series of bolts or the like. Extending between the side plates 50 is a horizontally oriented shaft 54 supported by fixed bearings 56 and carrying between spaced side plates 50, a second endless recycling conveyor pulley 58 similar in size and configuration to the upper drive pulley 46. The endless conveyor belt 12, which is formed of synthetic rubber material or the like which is readily cleanable, has extending outwardly from the surface of the same a plurality of rectangular cleats 60 of a width approximating the distance between plates 50 and chute panels 28, the cleats being at regularly spaced positions which may be slightly greater than the length of the crabs being processed. The radial height of the cleats may, of course, vary, but in general are on the order of 6 inches or so. Drive motor 42 rotates the conveyor belt 12 clockwise, FIG. 1, such that any crabs present on the upper inclined run 62 are carried to the top of the endless recycling feed conveyor and fall freely by gravity within chute 16 where they impact against the upper end of the shaker screen assembly 14.

In this respect, the shaker screen assembly 14 comprises a metal plate 64 having side plates 66 fixed thereto at each side and extending upwardly, the plate 64 being perforated as at 68, intermediate of its end, such that any crab particles of a size less than the diameter of the perforations 68 whether they be meat or waste will fall through the perforations. As mentioned previously, the entry end 70 of the shaker screen assembly plate 64, is imperforate. The cooked crabs falling off the discharge end of the conveyor pass downwardly within the free fall chute 16 and impact against the unperforated portion 70 of the shaker screen plate 64 to disintegrate into multiple pieces. Extending outwardly from the L-beam supports 26 on one or more sides of the chute panels 28 are fixed support plates 72. Depending from the support plates 72 are neoprene bands or straps 74 whose lower ends are fixed to the side plates 66 of the shaker screen assembly by suitable coupling means 76. Thus, the right hand end, FIG. 1, of the shaker screen assembly is resiliently supported by the stretchable bands 74. At the left hand end of the machine, additional neoprene resilient bands 78 have one end coupled to the side wall 66 of the shaker screen assembly and their other ends coupled to the spaced support plates 50 such that the shaker screen assembly is supported at or near both ends by resilient stretchable means.

Fixed to the table top 22 and supported by auxiliary support base 80 is a second drive motor 82 whose output shaft 84 carries a drive pulley which, in turn, carries a drive belt 86. A driven pulley 88 is mounted for rotation about a vertical axis defined by shaft 90 and bearings 92 within shaker screen sidewalls 66 above the driving pulley and is coupled to the same by the belt 86. A pair of eccentric weights 94 coupled to ends of shaft 90 cause oscillation of the shaker screen due to the angular shifting in position of the same, affecting a vibratory mode to the screen assembly 14. In this respect, it is noted that the shaker screen assembly 14 rather than being horizontal, is inclined slightly from the horizontal and downwardly from the crab impact portion 70 towards the discharge end 98 of the same. The discharge end of the perforated plate 64 extends beyond the feed end of the endless conveyor belt 12. In this respect, FIGS. 3 and 4, the side support plates 50 support the pivotable recycling hood 18 such that when the recycling hood is in a first or lowered position any of the larger crab particles C not passing through perforations 68 of plate 64 will be picked up by the moving paddles or cleats 60 and recirculated onto the upper feed run 62 of the endless recycling conveyor belt 12. In this respect, the recycling hood consists of a curved, semi-cylindrical front wall 100 and a pair of side walls 102, the side walls 102 including extensions 109 which cooperate with extensions 106 of the side plates 50 and pivot shaft 108, for supporting the recycling hood for pivotable action about a horizontal axis as defined by the shaft 108 passing through the projections 104 and 106 which are slightly overlapped at their ends. A pair of handles 110 extend outwardly from the sides of the hood allowing the hood to be manually moved from the lower or closed and recycling position shown in FIG. 3 to the open, nonrecycling and waste discharge position, shown in FIG. 4. In this position, trash falls down inclined plate 111.

In order to prevent the recycling larger crab particles C and the fresh crabs from falling off the upper run 62 of the endless recycling feed conveyor belt 12 as they move upwardly, a pair of rectangular guide plates 112 are fixed respectively to side plates 50 and chute side walls 28.

It is further noted that the tip ends of the cleats then move about the inside of curved front wall 100 of the recycling hood 18 and may be in actual contact with the same to insure recycling of the crab particles when the recycling hood is in its lower recycling position.

As mentioned previously, the major portion of the shaker screen plate 64 is perforated to allow the meat particles B and the smaller particles B of trash or waste to fall through the same during the multi-cycle recirculation of the crabs during processing. In this respect, at the front of the machine, the side plates 50 are further provided with a pair of ball bearings 114 which support a horizontally extending shaft 116 which carries endless conveyor belt pulley 118 of dimensions sufficient to support the endless meat culling and discharge conveyor belt 20 thereon. A similar pulley 120 is mounted at the rear of the machine on a shaft 122 which, in turn, is supported by adjustable bearings 124 carried by table support plates 126 at a position somewhat to the left of free fall chute 16. Motor 128 drives conveyor belt 20 via pulley 120 and belt 132. The length of the endless meat culling and discharge conveyor belt may be readily varied as may the direction of the same, and more than one culling station may be provided, depending upon the dexterity of the operator and the amount of culling necessary to insure that primarily meat is discharged at the left end of conveyor belt 20 onto inclined guide plate 134 free of trash.

The present invention is further directed to automated means for further separating small particles of crab shell from the crab meat which is discharged from the endless culling conveyor 20. In this respect, the drive motor 120 is additionally provided with pulley means and a second belt 136 which drives a rotatable, cylindrical drum 138 which is mounted for rotation about a horizontal axis as defined by support shaft 139, the shaft having fixed thereto a driven pulley 142 which carries the endless drive belt 136. The drum 138 which constitutes the metal cylinder is provided with a smooth peripheral surface which underlies and is spaced slightly downstream from the discharge end of the endless culling conveyor 20. In this case, the inclined plate 134 constitutes a guide plate such that the meat particles and remanent trash particles such as crab shell particles being discharged from the endless conveyor belt 20 impact the periphery of drum 138 at a point where the surface of the drum is moving upwardly and away from the endless conveyor belt 20 and the guide plate 134.

The separation operation may be best seen by reference to FIG. 7 wherein the small particles B of crab as they are discharged and fall along a path defined by the inclined guide plate 134, impact the periphery of the rotating drum 138. Trash particles primarily crab shell particles B' do not pass up and over the periphery of the rotating drum, that is, they are not carried by the rotating drum due to the lack of friction between the hard shell particles and the smooth surface of the metal drum, whereas, the softer and more moist meat particles B'' because of the friction between the same and the metal drum upon impact with the drum's surface continue to move in the direction of its rotation as evidenced by the arrow, FIG. 7, until they either fall by gravity from the downstream side of the rotating drum or are scraped from the periphery of the same by scraper blade 140 is is in contact with the bottom of the drum, the blade being fixed and supported by the frame member, such as frame member 24. In order to influence the frictional characteristics of the drum 138, a refrigeration unit 143 feeds a refrigerant 144 such as liquid nitrogen or the like to the interior of the drum through a conduit system 146, the refrigerating unit 143 incorporating controls (not shown) to insure that the outer periphery of the drum 138 is maintained at a temperature above 32° F. but less than 40° F. The temperature is critical in that a temperature below 32° F. will cause ice formation on the surface of the drum and defeat the separating function of the same. A third endless conveyor belt 148 is supported by pulley 150 so as to underlie the rotating drum 138, the third endless conveyor belt 148 moving in the direction of the arrow, FIG. 7, away from the rotating drum 138. Belt 148 defines a second manned culling area downstream of the drum. A suitable framework 152 supports the endless conveyor belt 140 which is driven by means (not shown). A rectangular open top bin 154 is positioned on framework 156 for receiving the trash particles and, in particular, the small shell particles. The employment of a single separating arrangement employing the drum 138 has the effect of automatically separating a minimum of 90 percent of the hard crab shell particles from the meat. The entrails and like particles have similar frictional characteristics insofar as the rotating drum is concerned, or may move along with the meat, but such particles may be removed either at the first culling station associated with belt 20 or at the second culling station as defined by endless conveyor belt 148. Primarily meat particles B'' are discharged onto the third endless conveyor belt 148. The spacing between the discharge baffle or guide plate 134 and the periphery of the drum is also critical as is its position relative to the drum itself. In the illustrated embodiment, a gap or distance of approximately 1¼ inches operates satisfactorily with the lower edge of the inclined plate 134 being approximately coplanar with the top of the rotating drum 138, although spaced forwardly of the same.

With the recycling hood in the lower or recycling position, new crabs may be added to belt 12 above hood 18 to the recycled crabs. The vertical height of the discharge end of the recycling conveyor, of course, may vary as may the position, and direction of inclination of the perforated shaker screen. The manned culling area may lie at any longitudinal position and the machine operated to effect selection removal of either the meat particles on belt 20 from the trash or vice versa, as desired. Further, while the agitation, and vibration to the perforated shaker screen is provided by eccentric means, other means may be employed such as electromagnetic vibrator or, in fact, a piezo-electric device, for instance.

In practice, depending upon the size and quality of the whole crabs, the temperature of the same, and the proximity in time from removal from the cooker to cleaning, a variable number of free falls plus the shaking action of the shaker screen is required to completely process a given crab. As an example, 20 free falls from a height of 5 feet plus shaking will ordinarily complete the cleaning cycle for one crab and with processing action in the sample machine being on the order of one crab per second with a maximum yield of 15 crabs to one pount of processed crab meat, the illustrated apparatus of the present invention readily produces 4 pounds of crab meat per minute.

What is claimed is:

1. A crab picking machine comprising:
   means for elevating cooked crabs to a free fall position,
   means underlying said elevating means for supporting said cooked crabs after free fall and disintegration of the crabs by impact therewith including a screen having openings therein of a size to permit meat and other crab particles of predetermined size to pass therethrough,
   means for vibrating said screen, and
   recycling means for directing crab particles in excess of said predetermined size to said elevating means.

2. The crab picking machine as claimed in claim 1, wherein: said screen is inclined to cause crabs to move in a first direction, said elevating means comprises an upwardly inclined endless recycling conveyor having its discharge end overlying said screen and moving in a direction opposite to that of movement of the crabs along the screen.

3. The crab picking machine as claimed in claim 2, wherein said recycling means includes means for selectively coupling the discharge end of the shaker screen to the intake end of the endless recycling conveyor.

4. The crab picking machine as claimed in claim 3, wherein said endless conveyor comprises an endless conveyor belt having a plurality of longitudinally spaced cleats extending outwardly from its outer surface and said recycling means comprise a curved plate closely overlying the peripheral path of the ends of the inclined conveyor belt cleats with its free edge, movable into contact with the discharge end of the screen.

5. The crab picking machine as claimed in claim 4, wherein said screen comprises a metal plate having a plurality of holes therein, intermediate of its ends, and a second endless conveyor belt is positioned underlying the screen to continuously move crab meat and other particles falling upon the same and through the holes of the screen to a culling area longitudinally displaced from the perforated shaker screen.

6. The crab picking machine as claimed in claim 5, wherein said screen is supported at least at one end relative to said recycling conveyor by a pair of flexible resilient bands on respective sides of said screen and said vibrating means includes a motor driven eccentric operatively coupled to said shaker screen for effecting vibration of the same.

7. The crab picking machine as claimed in claim 4, wherein said screen is supported at least at one end relative to said recycling conveyor by a pair of flexible resilient bands on respective sides of said screen and said vibrating means includes a motor driven eccentric operatively coupled to said screen for effecting vibration of the same.

8. The crab picking machine as claimed in claim 2, wherein said screen comprises a metal plate having a plurality of holes therein, intermediate of its ends, and an endless conveyor belt is positioned underlying the screen to continuously move crab meat and other particles falling upon the same and through the holes of the screen to a culling area longitudinally displaced from the perforated shaker screen.

9. The crab picking machine as claimed in claim 8, wherein said shaker screen is supported at least at one end relative to said recycling conveyor by a pair of flexible resilient bands on respective sides of said screen and said vibrating means includes a motor driven eccentric operatively coupled to said screen for effecting vibration of the same.

10. The crab picking machine as claimed in claim 2, wherein said screen is supported at least at one end relative to said recycling conveyor by a pair of flexible resilient bands on respective sides of said screen and said vibrating means includes a motor driven eccentric operatively coupled to said screen for effecting vibration of the same.

11. The crab picking machine as claimed in claim 1, wherein said screen comprises a metal plate having a plurality of holes therein, intermediate of its ends, and an endless conveyor belt is positioned underlying the screen to continuously move crab meat and other particles falling upon the same and through the holes of the screen to a culling area longitudinally displaced from the perforated shaker screen.

12. The crab picking machine as claimed in claim 11, wherein said screen is supported at least at one end relative to said recycling conveyor by a pair of flexible resilient bands on respective sides of said screen and said vibrating means includes a motor driven eccentric operatively coupled to said screen for effecting vibration of the same.

13. The crab picking machine as claimed in claim 1, wherein said screen is supported at least on one end relative to said recycling conveyor by a pair of flexible resilient bands on respective sides of said screen and said vibrating means includes a motor driven eccentric operatively coupled to said screen for effecting vibration of the same.

14. In combination:
  a stationary horizontally extending table,
  panel means defining a fixed vertical chute rising from said table at one end thereof,
  an upwardly inclined endless recycling conveyor overlying said table with the upper end mounted for rotation within said free fall chute,
  a shaker screen supported above said table with one end lying within said free fall chute and the other end underlying the lower end of said inclined endless recycling conveyor,
  a recycling hood pivotably coupled to said table and selectively positioned with respect to the discharge end of said shaker screen and the lower end of said endless recycling conveyor to cause crab particles of relatively large size to be picked up by said endless recycling conveyor for free fall discharge at the upper end of said chute or for discharge as trash at the discharge end of said shaker screen,
  vibrating means carried by said table and operatively coupled to said shaker screen for effecting vibration of the same,
  means for supporting said shaker screen at a slight inclination to the horizontal and downwardly towards the intake lower end of said recycling conveyor, said shaker screen being perforated to allow crab particles of a given size to fall therethrough during vibration of the same, and
  a second endless conveyor immediately underlying said perforated shaker screen for moving crab particles falling through the screen perforations toward one end of the picker to facilitate culling of the same.

15. The crab picking machine as claimed in claim 14, wherein said vibrating shaker screen includes a portion extending longitudinally beyond the intake lower end of said endless recycling conveyor belt, said recycling hood comprises an arcuate plate hinged to the front end of said recycling conveyor so as to wrap about the intake peripheral end of the same and to selectively contact the projecting discharge end of said vibrating shaker screen, to effect crab recycling or upon movement of the recycling scoop from recycling position, trash is readily discharged from the discharge end of the vibrating shaker screen.

16. The crab picking machine as claimed in claim 14, further comprising a rotating cylindrical metal drum underlying the discharge end of said second endless conveyor belt and spaced slightly beyond the same, an inclined guide plate directing crab particles falling freely from the discharge end of said second endless conveyor belt onto the periphery of said drum at an area of said drum which is moving upwardly and away from said second endless conveyor belt, the friction between said cylindrical metal drum and said meat particles being such as to cause said meat particles to move with said drum in the direction away from said second endless conveyor belt while the lack of friction between the drum and the crab shell particles causes said crab shell particles to bounce off of said drum and continue to move downwardly opposite to the direction of drum rotation for separation therefrom.

17. The crab picking machine as claimed in claim 16, further comprising means for maintaining the temperature of said drum between 32° F. and 40° F.

18. The crab picking machine as claimed in claim 17, wherein a third conveyor belt underlies said cylindrical metal drum to move meat particles falling from the rotating cylindrical metal drum on the downstream side thereof, away from said drum for manual culling and said machine further comprises scraper means in contact with the bottom of said rotating cylindrical metal drum to insure removal of meat particles and deposition of the same onto said third endless conveyor belt.

19. The crab picking machine as claimed in claim 1, further comprising: a rotating drum, means for directing meat and other crab particles of limited size, after passage through said vibrating shaker screen onto the periphery of said rotating drum as it is moving upwardly and away from the oncoming particles, the surface of said drum being such that the friction between the meat particles and said drum causes said meat particles to be carried by said drum in said direction of movement while the lack of friction between the drum and crab shell particles causes said crab shell particles to fall from the drum in a direction opposite to its rotation for separation therefrom.

20. The crab picking machine as claimed in claim 19, wherein said drum comprises a hollow metal cylinder and said machine further includes means for maintaining the temperature of said drum between 32° F. and 40° F.

21. The crab picking machine as claimed in claim 20, wherein a first conveyor belt underlies said screen to receive the crab particles passing through said screen, said metal cylinder underlies and is spaced slightly beyond the discharge end of said endless conveyor belt, a further endless belt underlies said metal cylinder for moving meat particles falling from the downstream side of said metal cylinder away from the same for manual culling and scraper means in contact with the bottom of said rotating metal cylinder insures removal of the crab meat particles from the cylinder periphery for gravity discharge onto said further endless culling belt.

* * * * *